US010985536B2

(12) United States Patent
Black et al.

(10) Patent No.: US 10,985,536 B2
(45) Date of Patent: Apr. 20, 2021

(54) PORTABLE AIR IONIZER

(71) Applicants: BIONIC PRODUCTS PTY LTD, Varsity Lakes (AU); AUSTRALIAN ARROW PTY LTD, Carrum Downs (AU)

(72) Inventors: Debbie Louise Black, Queensland (AU); George Tzantos, Victoria (AU); Rick Dall, Queensland (AU)

(73) Assignee: BIONIC PRODUCTS PTY LTD, Queensland (AU)

( * ) Notice: Subject to any disclaimer, the term of this patent is extended or adjusted under 35 U.S.C. 154(b) by 61 days.

(21) Appl. No.: 16/094,814

(22) PCT Filed: Apr. 18, 2017

(86) PCT No.: PCT/AU2017/050343
§ 371 (c)(1),
(2) Date: Oct. 18, 2018

(87) PCT Pub. No.: WO2017/181226
PCT Pub. Date: Oct. 26, 2017

(65) Prior Publication Data
US 2019/0123518 A1 Apr. 25, 2019

(30) Foreign Application Priority Data
Apr. 18, 2016 (AU) ................................ 2016901438

(51) Int. Cl.
*B01D 53/02* (2006.01)
*H01T 23/00* (2006.01)
*H01T 19/04* (2006.01)
*B03C 3/32* (2006.01)
(Continued)

(52) U.S. Cl.
CPC ................ *H01T 23/00* (2013.01); *B03C 3/32* (2013.01); *B03C 3/41* (2013.01); *B03C 3/68* (2013.01); *H01T 19/04* (2013.01)

(58) Field of Classification Search
CPC .... B03C 3/32; B03C 3/41; B03C 3/68; H01T 19/04; H01T 23/00
See application file for complete search history.

(56) References Cited

U.S. PATENT DOCUMENTS 3,818,269 A * 6/1974 Stark ........................ A61N 1/44 361/231
4,713,724 A * 12/1987 Voelkel .................... A61N 1/44 361/231
(Continued)

FOREIGN PATENT DOCUMENTS

AU 2009210352 B2 3/2010

OTHER PUBLICATIONS

International Search Report dated Jun. 2, 2017 cited in PCT/AU2017/050343.

*Primary Examiner* — Christopher P Jones
(74) *Attorney, Agent, or Firm* — Workman Nydegger

(57) ABSTRACT

A portable ionizer (100) having a discharge electrode electrically connected to a circuit board (5) to produce ions when energised, a portable power source (6) electrically connected to the circuit board (5) to energize the discharge electrode (8); and a portable case (101) that substantially encloses the power source (6), the circuit board (5), and the discharge electrode (8).

20 Claims, 13 Drawing Sheets

(51) Int. Cl.

| | |
|---|---|
| ***B03C 3/41*** | (2006.01) |
| ***B03C 3/68*** | (2006.01) |

(56) References Cited

U.S. PATENT DOCUMENTS

| | | | | | |
|---|---|---|---|---|---|
| 4,941,068 | A * | 7/1990 | Hofmann | A61N 1/44 | 128/202.25 |
| 5,065,272 | A * | 11/1991 | Owen | A61N 1/44 | 361/231 |
| 5,484,472 | A * | 1/1996 | Weinberg | B03C 3/66 | 96/26 |
| 6,056,808 | A | 5/2000 | Krause | | |
| 7,995,322 | B2 * | 8/2011 | Shaw | H01T 23/00 | 361/231 |
| 2003/0147784 | A1 | 8/2003 | Joannou | | |
| 2005/0147544 | A1 * | 7/2005 | Joannou | A61L 9/22 | 422/186.04 |
| 2006/0002051 | A1 * | 1/2006 | Goudy, Jr. | C01B 13/11 | 361/220 |
| 2010/0039746 | A1 * | 2/2010 | Shaw | H01T 23/00 | 361/231 |
| 2012/0224293 | A1 * | 9/2012 | Partridge | H01T 23/00 | 361/230 |
| 2013/0083445 | A1 * | 4/2013 | Okahashi | H01T 23/00 | 361/230 |

* cited by examiner

Substitute Sheet
(Rule 26) RO/AU

PORTABLE AIR IONIZER

FIELD OF THE INVENTION

The invention relates to a portable air ionizer. In particular, the invention relates, but is not limited, to a portable air ionizer to be worn by a user as, for example, a pendant.

BACKGROUND TO THE INVENTION

Reference to background art herein is not to be construed as an admission that such art constitutes common general knowledge.

Darwinian theory states that humans evolved on Earth and are consequently adapted to interact beneficially with their environment. For example, when exposed to sunlight, human skin synthesizes vitamin D, a useful vitamin for overall well-being. The use of blue light (i.e., the colour of the sky), when used in conjunction with an aminolevulinic acid treatment, is documented to improve porphyrin response times in skin.

The human eye is another organ known to react to environmental factors. Phototherapy, or the science of exposing the body to a spectrum of light for therapeutic purposes, is known or believed to be effective in treating Seasonal Affective Disorder, non-seasonal depressions, and delayed sleep phase syndrome when specific types of light are received by the human eye. Applicant's technology relates to known benefits associated with short-term exposition of the human breathing apparatus to mildly ionized air.

The Earth's environment includes an atmosphere made mostly of oxygen gas ($O_2$), nitrogen gas ($N_2$), water vapour ($H_2O$), some carbon dioxide gas ($CO_2$), and traces of rare gases such as hydrogen gas ($H_2$).

These gaseous molecules are found in greater proportions in their neutral electrical valence than in positively or negatively charge valences. In the environment, because of a plurality of natural causes, including, for example, lightning, static electricity, cosmic irradiation, chemical processes, and even molecular interactions, the valence of these molecules can change from positive to negative or vice versa. A negative ion is a neutral molecule holding an extra electron defined by convention as a negative charge ($O_2$—, $N_2$—, $H_2O$—, $CO_2$—, $H_2$—, or $O_3$—).

A positive ion is a neutral molecule with one missing electron resulting in a positive charge of the molecule. In air, some of these ions are found as molecules surrounded by neutral valence water vapour. Numerous control studies have shown that human wellbeing is enhanced in artificially enhanced environments having negative ionization. Other studies have shown that high-voltage or high-frequency ionization of air can result in the creation of undesired chemical reactions in air, including, for example, the formation of $O_3$, $NO_2$, $NO_3$, $H_2O(O_3)$, etc.

Negative air ionization devices have therefore been developed to ionize the surrounding air to make use of the various health benefits. Typically, these are larger devices, including ones that sit on a table top, or the like. Some have selectable frequencies capable of voltage and frequency modulation to create a controlled electronic corona to break down the dielectric potential of some molecules in air.

The principle technology is the creation of a strong localized magnetic field capable of exciting molecules at natural resonating frequencies in the vicinity of a sharp tipped needle where the curvature is maximized to bend the magnetic field to greater potentials.

However, negative and positive ions are naturally unstable and revert to their neutral state once they encounter their counterpart, or in the case of a positive ion, once it finds a loose electron. For the beneficial effect of air ionizers to be observed, a noticeable quantity of ions must be produced and placed in the atmosphere.

Furthermore, not all air ionization devices produce ingestible biologically active oxygen molecules consistently over an extended period of time, and the further away from the user the ionizer is placed, the less effective the ionized air can become.

While attempts have been made to make air ionizers more portable, there are a number of challenges and complexities required to be overcome to result in an effective and efficient design that can provide sufficient air ionization properties from a small and portable package.

OBJECT OF THE INVENTION

It is an aim of this invention to provide a portable air ionizer which overcomes or ameliorates one or more of the disadvantages or problems described above, or which at least provides a useful alternative.

Other preferred objects of the present invention will become apparent from the following description.

SUMMARY OF INVENTION

In one form, although it need not be the only or indeed the broadest form, there is provided a portable air ionizer, comprising:

a discharge electrode electrically connected to a circuit board to produce ions when energised;

a portable power source electrically connected to the circuit board to energize the discharge electrode; and a portable case with a support means that substantially encloses the power source, the circuit board, and the discharge electrode, wherein the circuit board comprises a double ended voltage multiplier connected to an AC driver to energise the discharge electrode.

Preferably the double ended voltage multiplier comprises a plurality of alternating polarity diodes connected in parallel. Preferably a capacitor is connected between adjacent diodes. Preferably a first portion of the plurality of diodes are connected between a first input from the AC driver and a high voltage positive output and a second portion of the plurality of diodes are connected between a second input from the AC driver and a high voltage negative output.

Preferably AC driver comprises a power management system that includes a high voltage self-resonant sine-wave oscillator. Preferably the discharge electrode is a needle discharge electrode. Preferably the self-resonant sine-wave oscillator has predetermined limits. Preferably the self-resonant sine-wave oscillator is controlled by at least one of a voltage regulation circuit and a feedback system. Preferably the voltage regulation circuit is a dual-step voltage regulation circuit.

Preferably the case is integral. Preferably the case comprises at least two portions which are welded together to form a single integral housing around the power source, the circuit board, and the needle discharge electrode. Preferably the case has an opening at or near the needle discharge electrode configured to allow passage of negative air ions.

Preferably the discharge electrode is connected to the circuit board via an electrode spring member. Preferably the electrode spring member comprises a helical coil spring.

Preferably the electrode spring member comprises two separate helical coil spring portions interconnected by a bridge portion. Preferably the electrode spring member is seated in a hollow of a concave, cup shaped needle holder.

Preferably the portable air ionizer further comprises at least one ground electrode. Preferably the ground electrode has at least a portion located externally of the portable case. Preferably the ground electrode is in the form of a protection surround. Preferably the protection surround is electrically connected to a negative pole of the portable power source. Preferably the protection surround is connected to the negative pole of the portable power source via a ground spring. Preferably the ground spring comprises a torsion spring.

Preferably at least two ground electrodes are provided. Preferably at least one ground electrode is located on a first side of the portable case and at least one ground electrode is located on a second side of the portable case. Preferably the portable case as apertures adjacent the ground electrodes to allow a portion of the ground electrode and/or the ground spring to pass therethrough.

Preferably the ground electrode is electrically connected to a cathode located adjacent the needle to produce an electric field between the needle discharge electrode and each ground electrode.

Preferably portable power source comprises a DC power source. Preferably the DC power source comprises a rechargeable battery. Preferably the ionizer further comprises an external power supply connector for charging the rechargeable battery on an external circuit. Preferably the portable DC power source is a lithium-ion battery with a maximum recharge voltage of about 4.2 volts and a discharge limit of about 3.3 volts. Preferably an electrical field created by the needle discharge electrode and the ground electrodes accelerates ions to an energy level of 1.9 cm2/V s.

Preferably the portable air ionizer comprises a user interface. Preferably the user interface comprises a plurality of output indicators, preferably LEDs, and a plurality of input controllers, preferably buttons.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
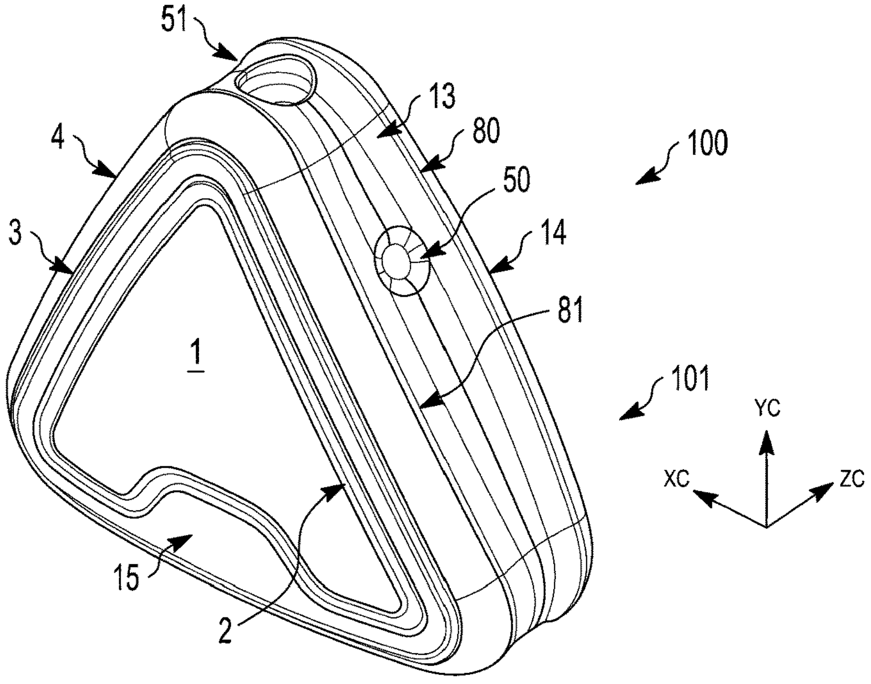
FIG. 1 illustrates a front perspective view of a portable air ionizer without a neck strap.
Figure 2:
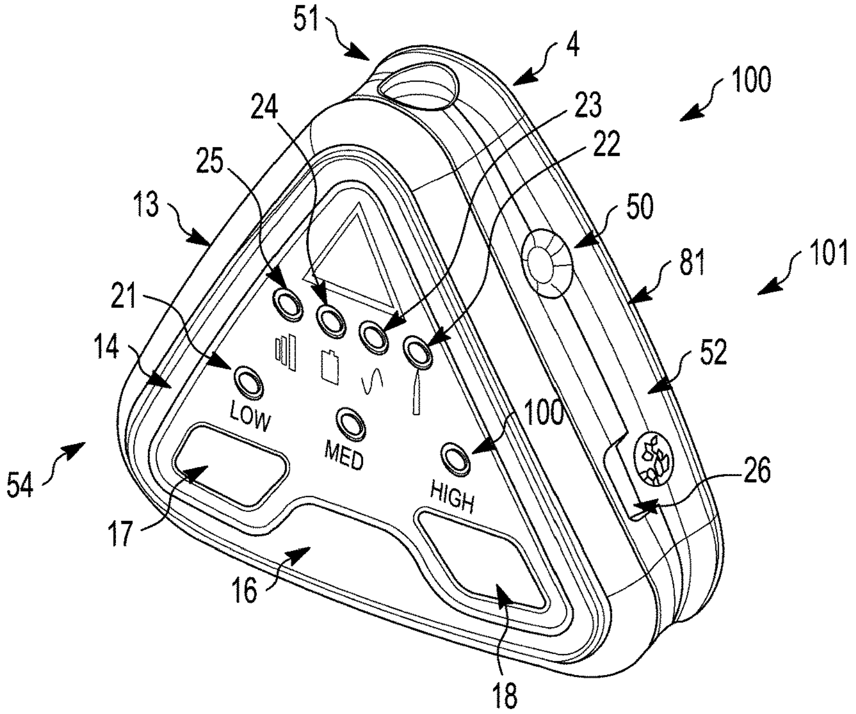
FIG. 2 is a rear perspective view of the portable air ionizer illustrated in FIG. 1 showing a control panel.
Figure 3:
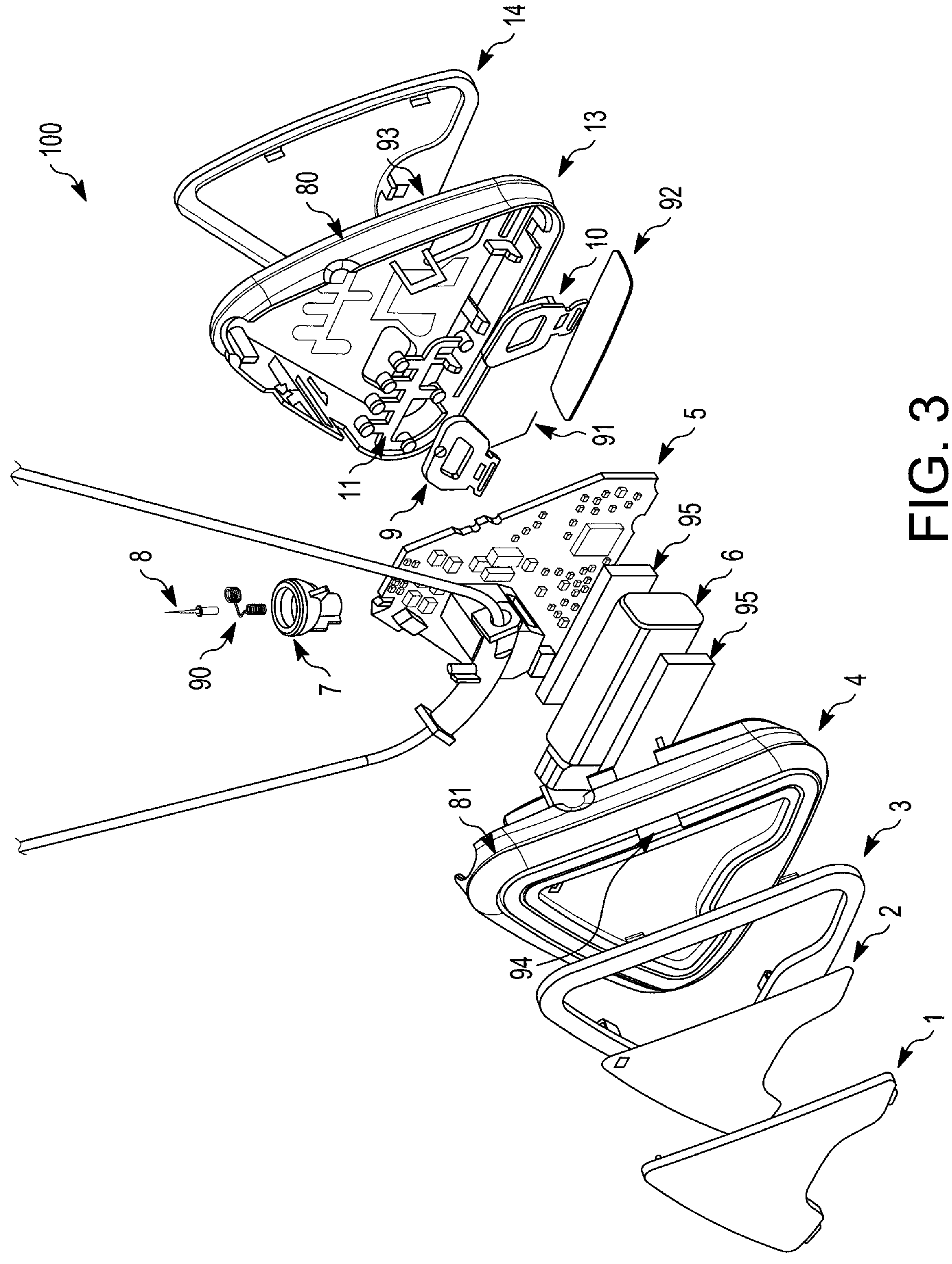
FIG. 3 is an exploded perspective view of the pendant ionizer with a neck strap.
Figure 4:
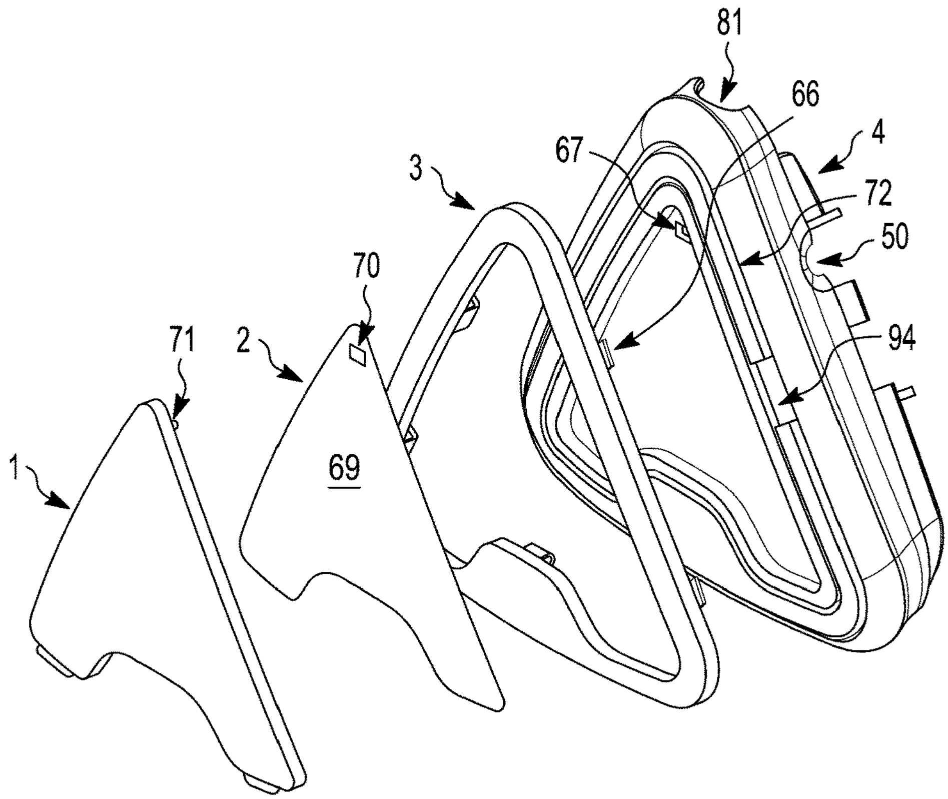
FIG. 4 is an exploded perspective view of a front portion of the portable case and a second protection surround.

As shown in FIGS. 1 to 3, a portable ionizer 100 includes a portable case 101 shown in a triangular shape with curved corners and rounded bevels. Although the curved triangular shape is preferred for a number of reasons, it will be appreciated that other shapes could be utilised.

The case 101 is shown in greater detail in FIGS. 3, 4, 7 and 8. The case 101 comprises a front portion 4 and a back portion 13 as ultrasonically-welded plastic moulded shells as illustrated by 80, 81 with a plurality of internal structural elements such as a clip 73 on the back portion 13 for temporary connection with the front portion 4 prior to welding and a series of holes 72 for support of tabs from other supporting elements 65 located on the first protection surround 14 made of metal and acting as a ground connected via wire to the negative pole of the power source 6 or the second protection surround 3 also connected via the supporting elements 66 to the battery 6.

The front and back portions 4, 13 also show, at their interface, openings 50, 51, 52. Strap opening 50 allows for the passage of the neck strap 12, a power opening 52 allows for access to a charger (not shown), primary opening 51 allows for the release of negative ions from the needle 8, which is connected to the circuit board 5 via an electrode spring 90. As seen most clearly in FIG. 5, the spring is a helical coil spring. Specifically, it comprises two helical coils interconnected by a bridge portion.

Other features such as supports for holding the buttons 9, 10 are attached to the internal portion of the back portion 13. The internal portion also includes openings 61 for the passage of buttons 9, 10 or LEDs 11 as shown in FIG. 3. The internal portion also provides support of the circuit board 5, and the needle support 7 along with the needle 8. The needle support 7 comprises a concave shaped cup having a hollow 62 surrounded by a substantially annular wall 63. A support leg 64 is provided on an external portion of the needle support 7.

Figure 6:
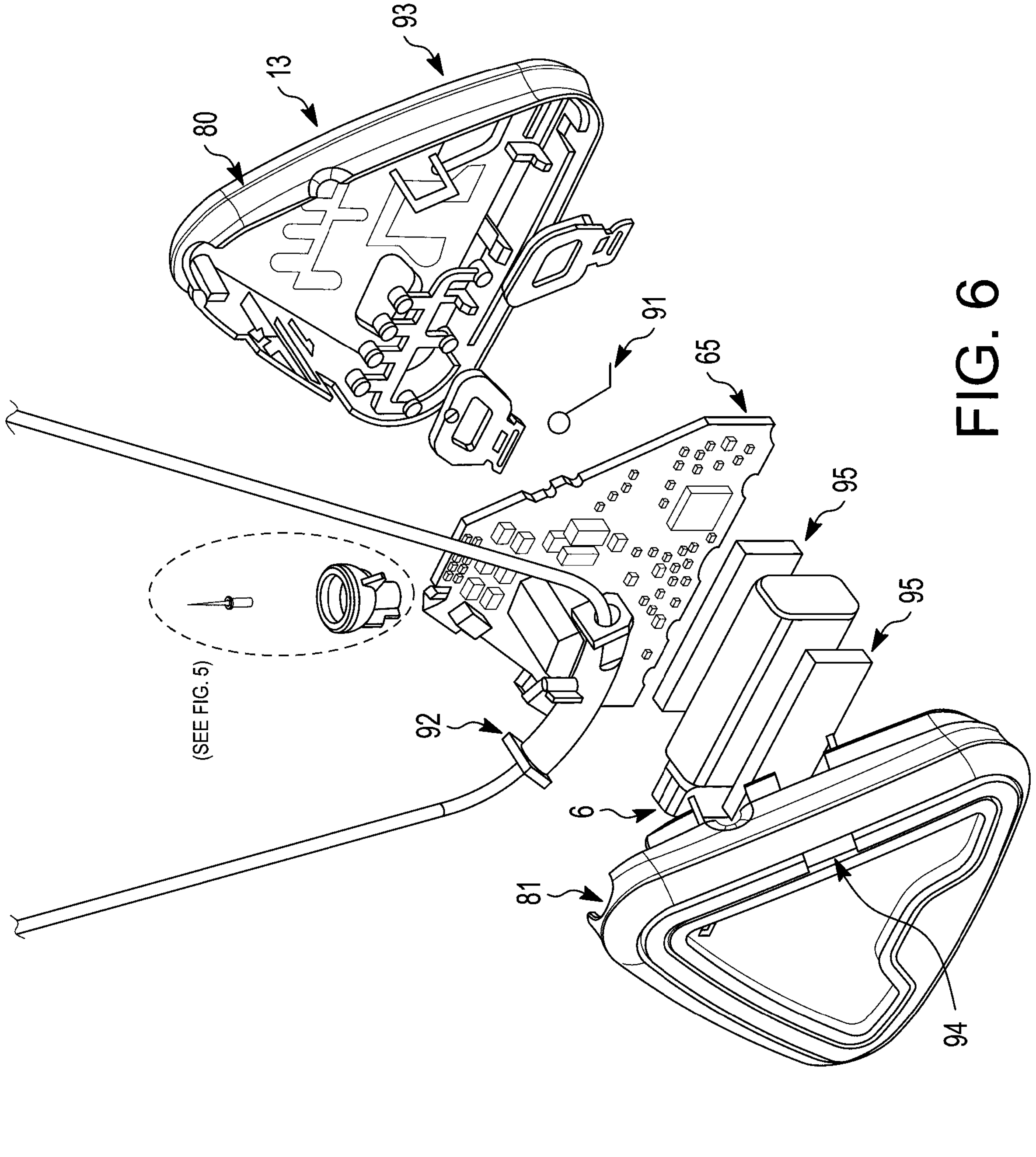
FIG. 6 is an exploded perspective view of the front and back portions of a portable case of the pendant ionizer with internal components contained therein.
Figure 7:
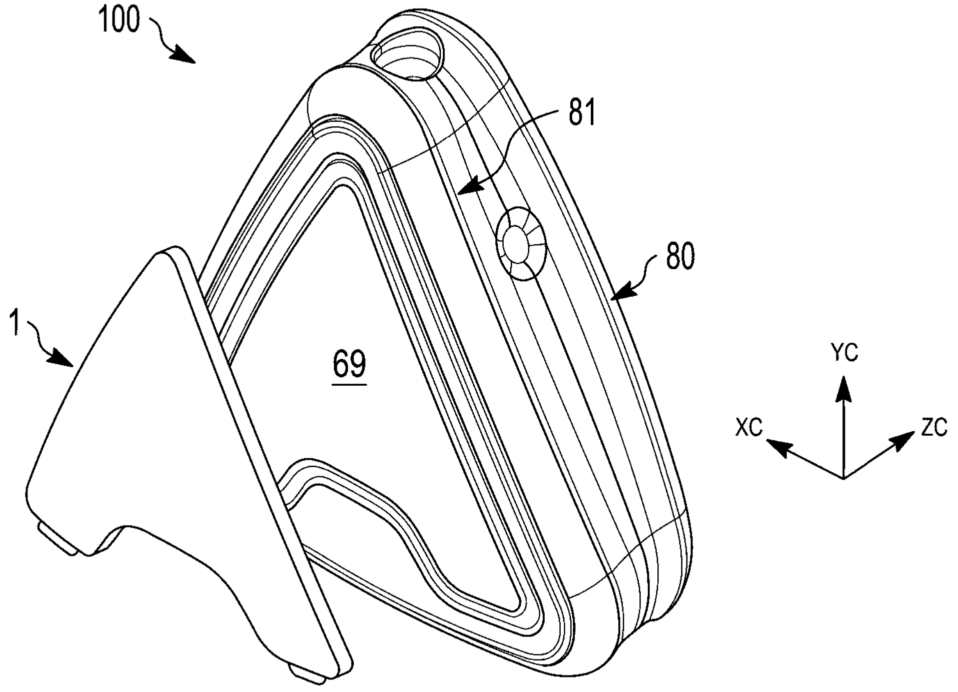
FIG. 7 is a partially exploded perspective view of the portable air ionizer with a front cover removed.
Figure 8:
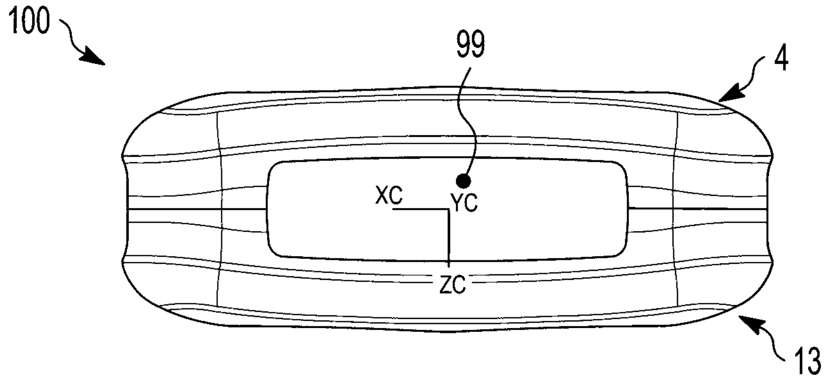
FIG. 8 is a bottom view of the portable air ionizer.

FIG. 6 shows how protection surrounds 3, 14 can be slid into small openings 72 provided in case covers 4, 13 to lock in place via support tabs 73, 60 and electrically connected to the circuit board 5 via a ground spring 91 through openings 93 and 94.

A triangular portable case 101 is shown and contemplated as a particularly compact embodiment where the battery 6 is substantially rectangular and is located at the bottom portion of the case 101 and the needle holder is located at the top portion of the case 101.

While a preferred geometry of the portable case 101 is shown, the use of any case shape holding a power source of any geometry capable of association with one or a plurality of negative ion needles 8 is contemplated. For example, if two needles are used in an alternate embodiment working with two rectangular batteries, a square case could be used to optimise the volume of the overall pendant ionizer 100. One of ordinary skill in the art recognises different combinations of geometries used in conjunction with different geometries of DC battery power sources. One of ordinary skill in the art also recognises that while a neck strap 12 is shown, other means to secure the pendant ionizer 100 to a user are contemplated, including but not limited to an elastic arm band, a clip, a brace, a pin, a magnet, or any other type of fixation means commonly employed to attach such a device to a wearer.

What is also contemplated is the use of the pendant ionizer 100 integrated with other devices, including, for example, a pair of glasses, earphones, an existing necklace, or an item placed within a pocket or holder on a vest. A guide tube 92 may be provided in one embodiment to allow alternative means of fastening to be used safely.

Returning to FIG. 5, negative ions are produced when air is placed into contact with tip 60 of needle discharge electrode 8, located on the upper portion of the pendant ionizer 100 at or near primary opening 51 as illustrated most clearly in FIGS. 3 and 6.

The tip 60 of the needle 8 is the point with the greatest radii of curvature r and a density of charge d will become $q=4^{-}\pi r^{2}d$, the potential $p=4^{-}\pi rd$ and the outward force f, normal to the surface becomes $f=2^{-}\pi d^{2}$. When d reaches a certain level the force f becomes sufficient to break down the dielectric of the surrounding molecules and a streamer or corona appears. It has also been found that the production of small desirable ions decreases at natural or proper frequencies of over 50 kHz as carrier frequencies.

In U.S. Pat. No. 5,973,905, hereby incorporated fully by reference, it is taught how some preferred selectable modulation frequencies for a negative air ion generator with a needle point are typically about 40 Hz, 25 Hz, 10 Hz, or about 7.83 Hz. The carrier frequency is typically a frequency in the range of 15 kHz to 20 kHz with about 17 kHz being optimal. Frequencies range from 1 Hz to any desired frequency. U.S. Pat. No. 5,973,905 also teaches how the corona requires the proximity of ground electrodes.

In the case of the pendant ionizer 100, triangular ground electrodes 3, 14 as the surrounds reinforce the local electrical field created in the corona to separate negatively charged ions and positively charged ions to prevent their recombination and accelerate them. In the case of the embodiment as shown, the triangular ground electrodes 3, 14 are located on the top of the external case 101 and accelerate the ions up to an energy level of 1.9 cm2/V s.

In one embodiment, the portable air ionizer 100 is made of at least a needle discharge electrode 8 electrically connected to a circuit board 5 to produce an outward flux of negative ions when energized. A portable DC power source, shown as a rectangular lithium-ion battery 6 with a maximum recharge voltage of about 4.2 volts and a discharge limit of about 3.1 volts, includes an anode and a cathode electrically connected via a connector as shown in FIG. 15 as CN2 to energise the needle discharge electrode 8.

Figure 9:
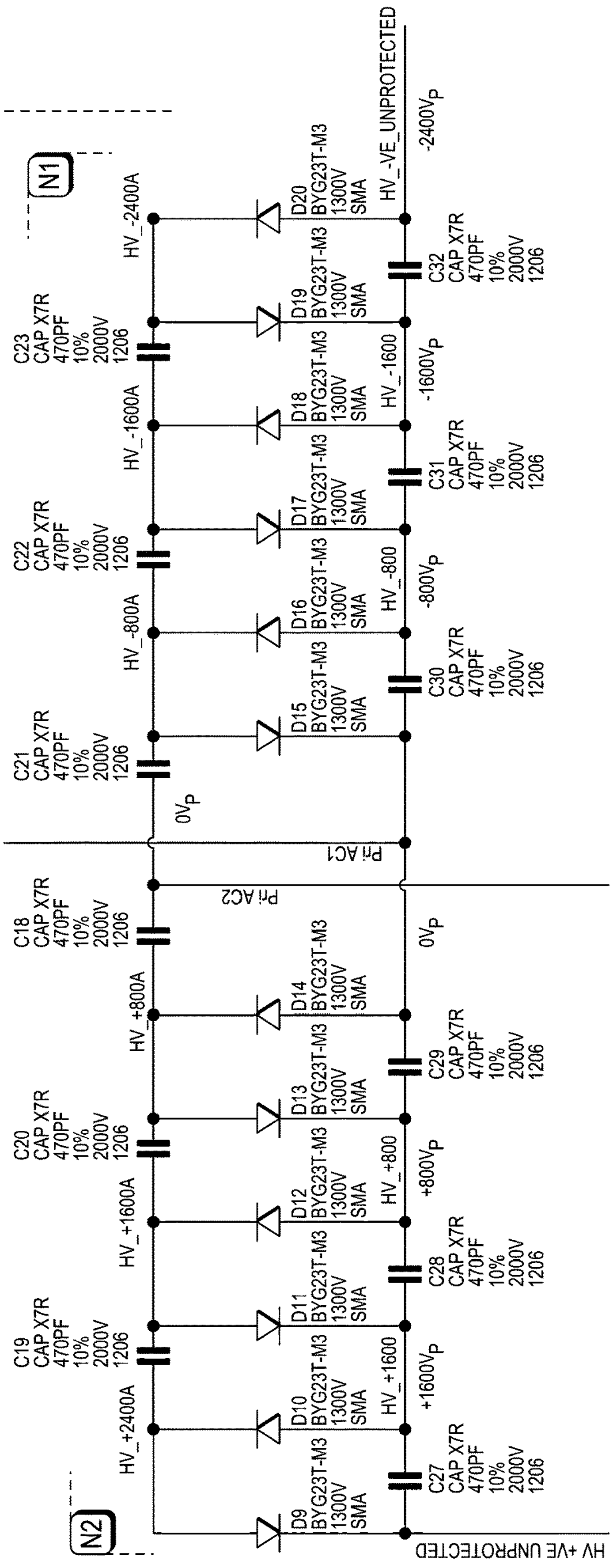
FIG. 9 is a diagrammatic representation of a double-ended high-voltage power supply circuit.

In the embodiment shown in FIG. 1, the portable case 101 includes a support means for holding the power source such as a neck strap 12, a circuit board 5 with the different elements preferably as shown in FIGS. 9 to 16, and the needle discharge electrode 8. The portable case 101 includes two ground electrodes 3, 14 electrically connected to the positive end of the high-voltage multiplier as shown in FIG. 9 to produce an electric field between the needle discharge electrode 8 and each ground electrode 3, 14.

Figure 10:
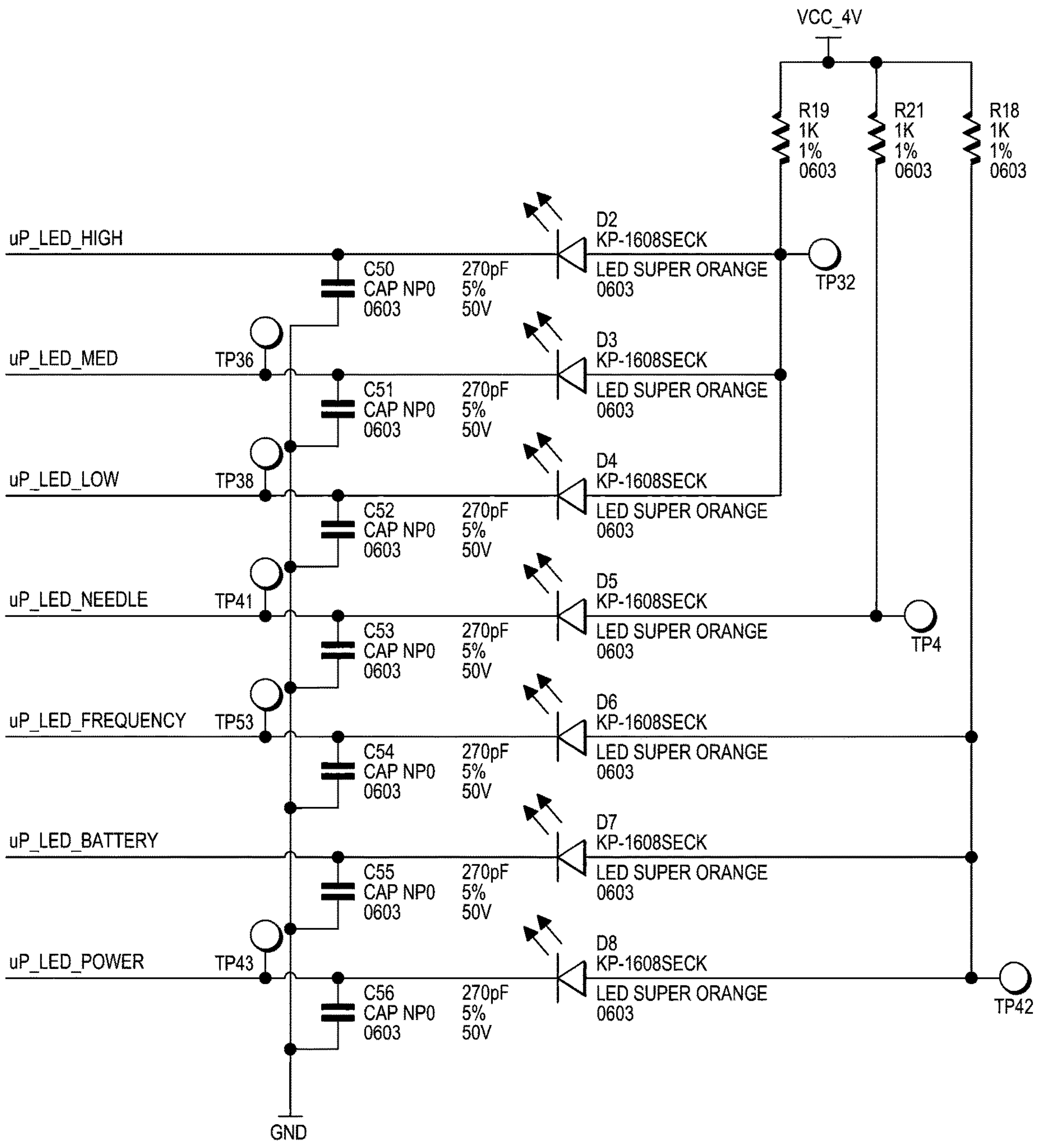
FIG. 10 is a diagrammatic representation of an LED distribution circuit.
Figure 11:
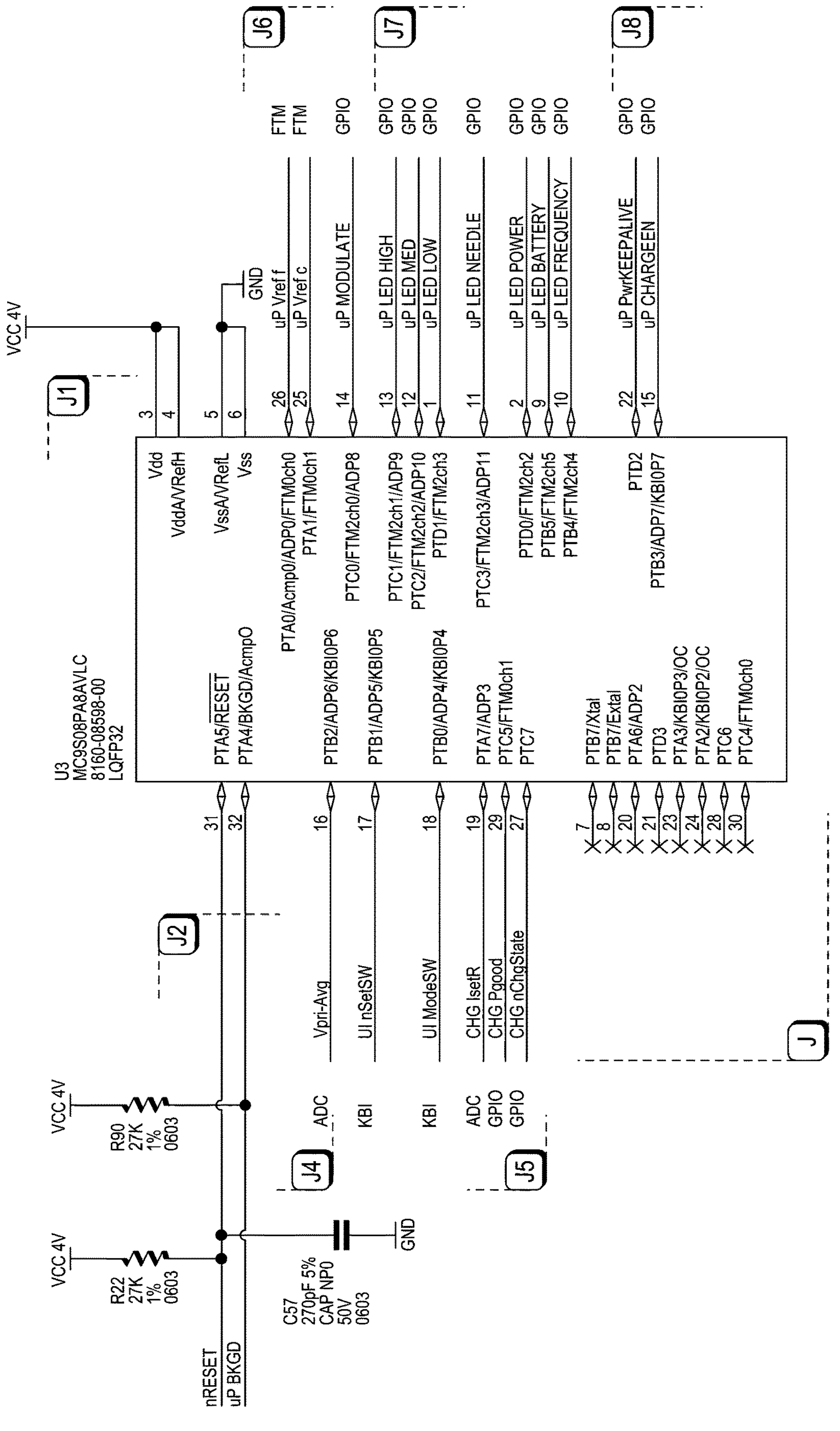
FIG. 11 is a diagrammatic representation of a microprocessor circuit layout.
Figure 12:
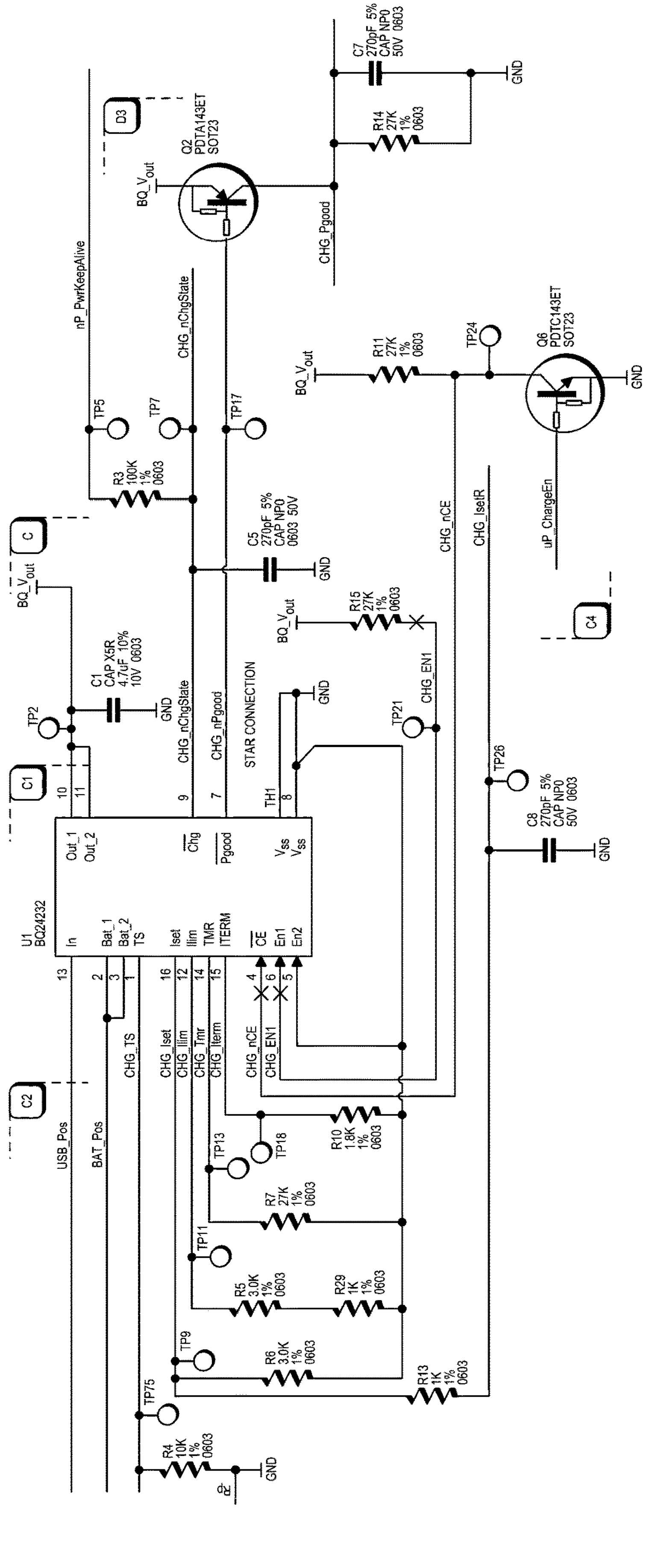
FIG. 12 is a diagrammatic representation of a charge control circuit.
Figure 13:
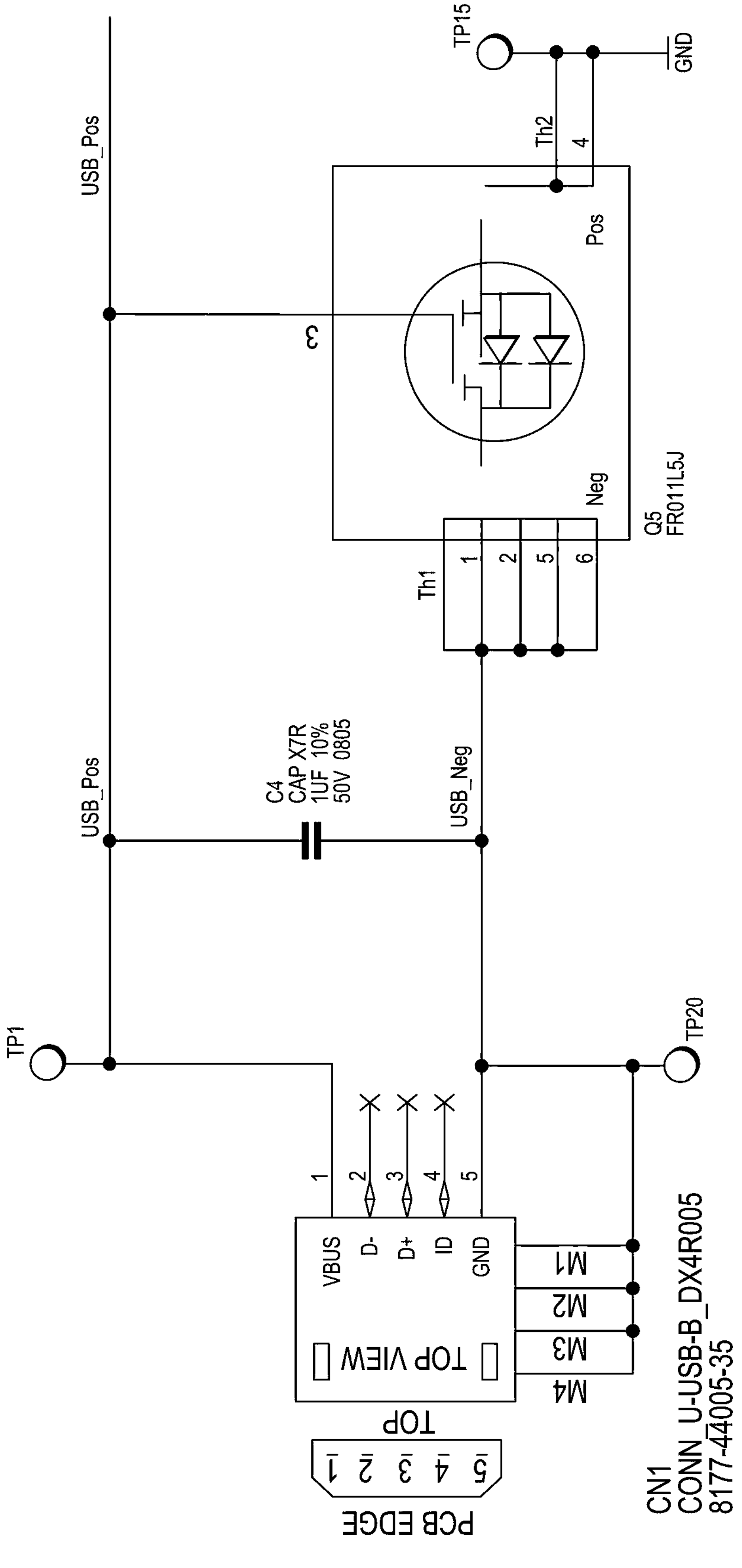
FIG. 13 is a diagrammatic representation of a power socket connection.
Figure 14:
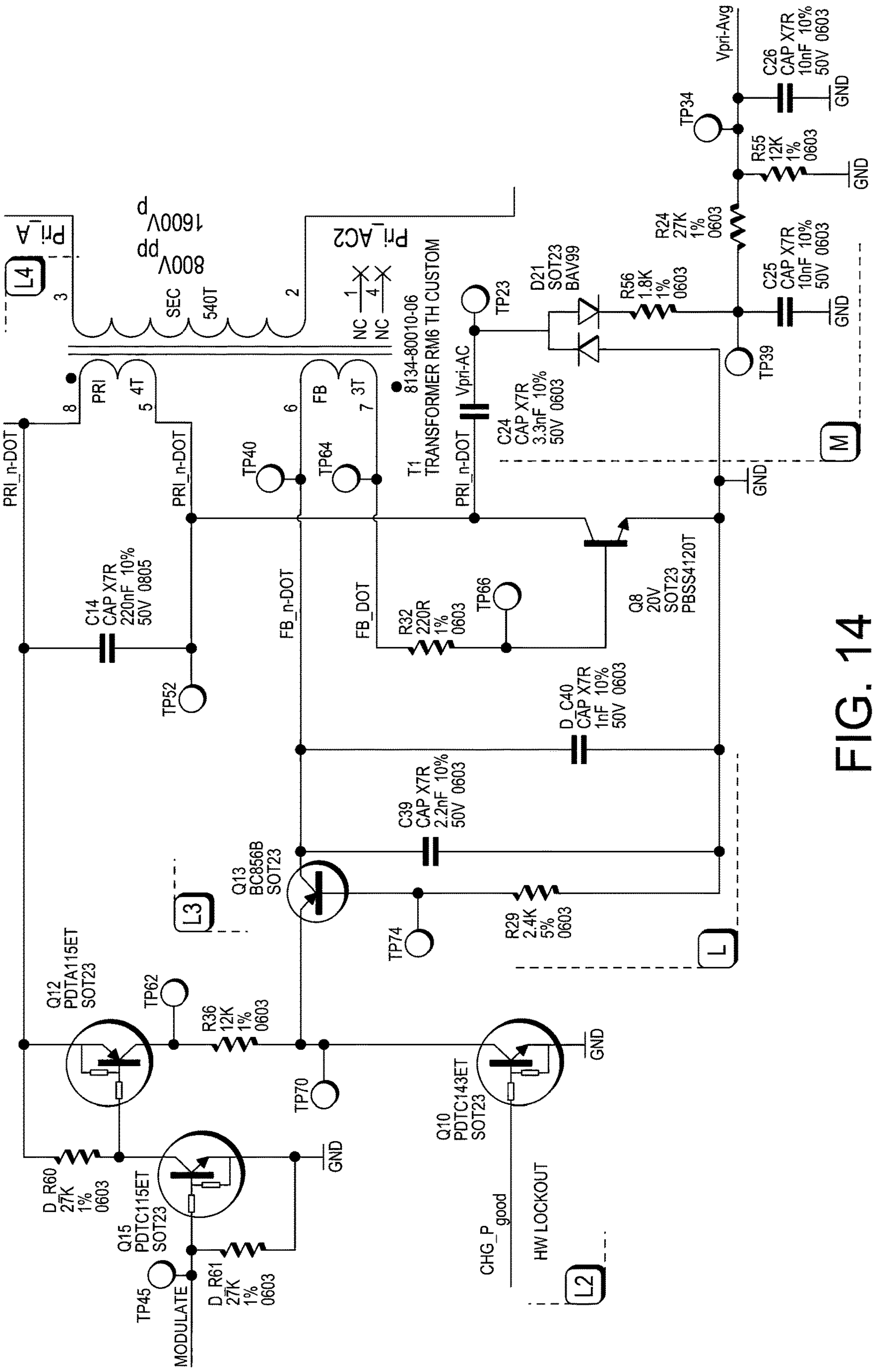
FIG. 14 is a diagrammatic representation of a self-resonant sine-wave AC converter.
Figure 15:
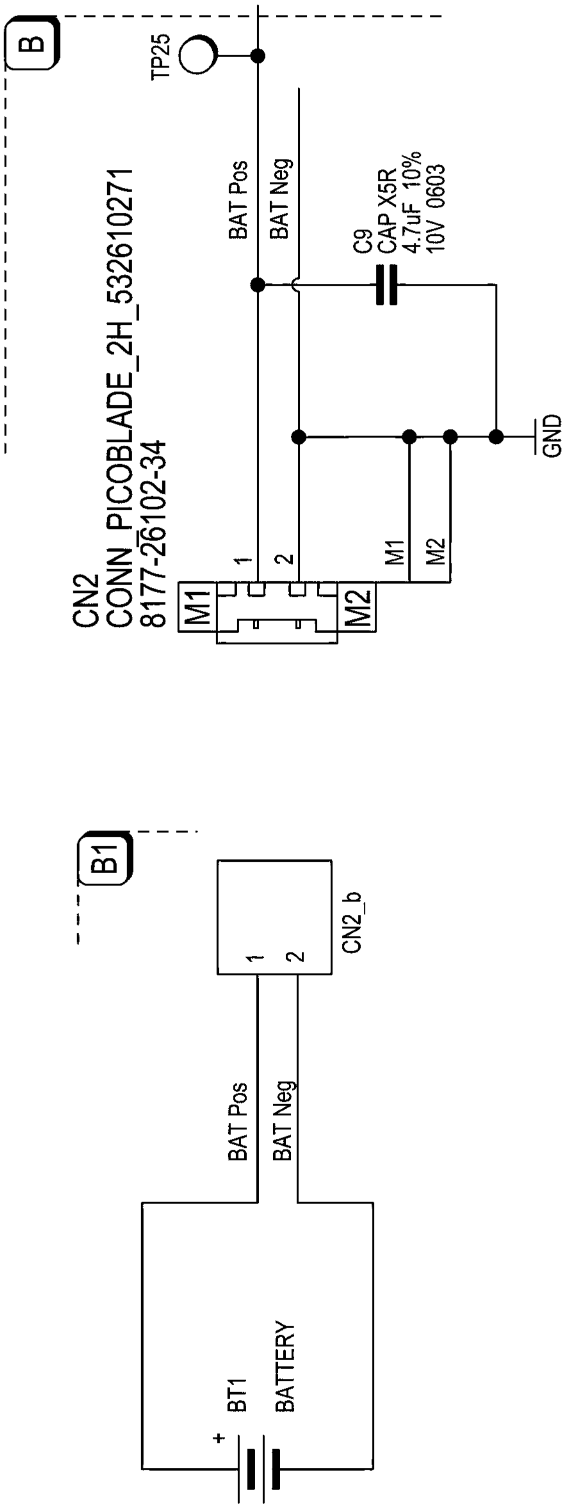
FIG. 15 is a diagrammatic representation of a battery recharge mechanism.
Figure 16:
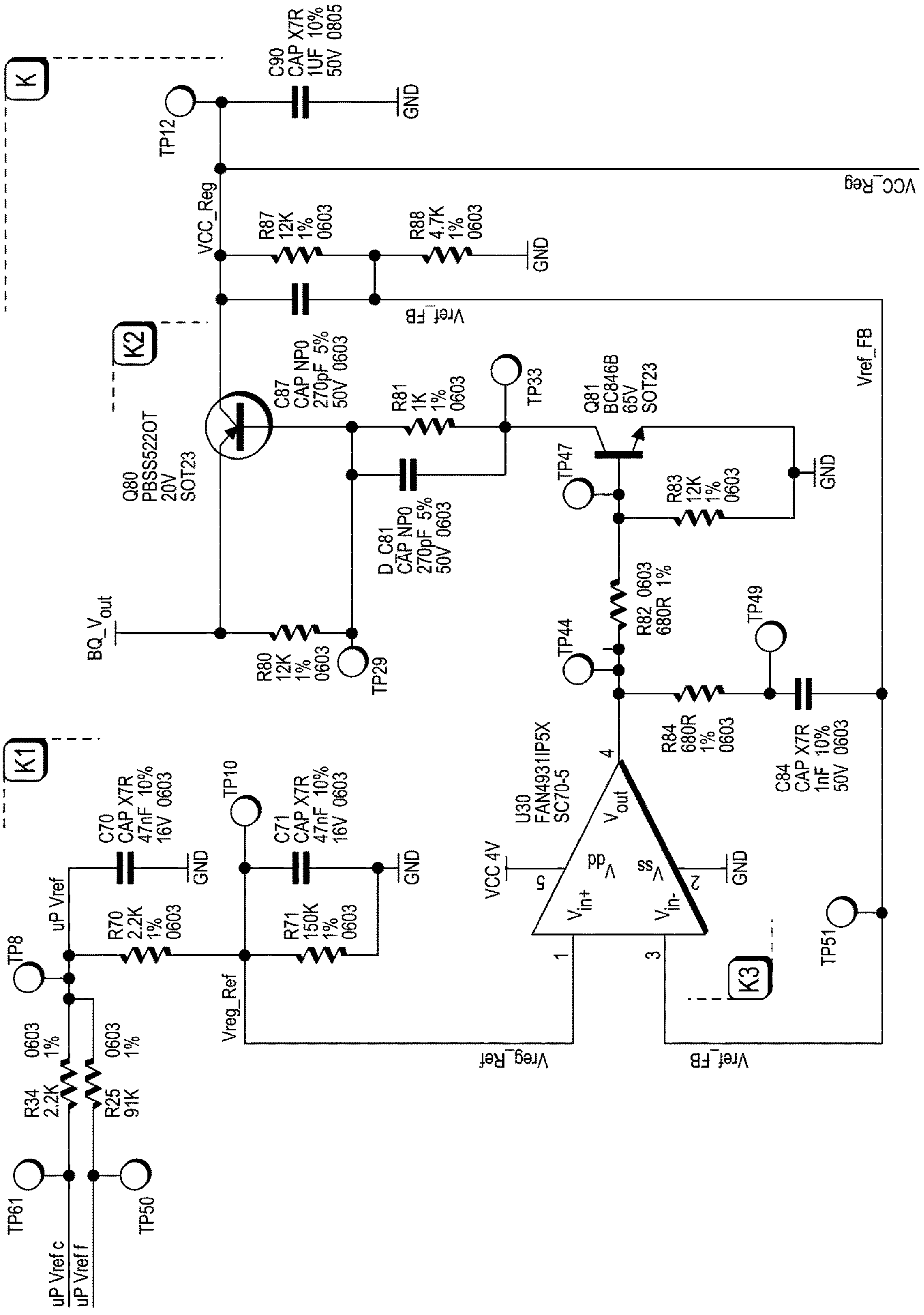
FIG. 16 is a diagrammatic representation of a voltage regulation system used to control the level of a high-voltage output.

The circuit board 5, with reference to the example circuit layouts of FIGS. 9 to 16, includes various portions including a double-ended voltage multiplier high voltage power supply circuit as illustrated in FIG. 9, an LED distribution circuit as illustrated in FIG. 10, a programmed microprocessor as illustrated in FIG. 11, a charge control circuit as illustrated in FIG. 12, a power socket connection as illustrated in FIG. 13, an AC driver in the form of a self-resonant sine-wave AC oscillator inverter as illustrated in FIG. 14, a battery recharge system as illustrated in FIG. 15, and a voltage regulation system used to control a high-voltage output level as illustrated in FIG. 16.

The ionizer 100 also includes a power management system as part of the circuit board 5 to minimise the drain of energy from the portable DC power source 6 as the needle discharge electrode 8 is energised and produces ions in the electric field. FIG. 16 shows a regulator, driven by the microcontroller shown in FIG. 11, to provide coarse and fine control of the high-voltage output level based on a feedback signal, shown as Vpri_Avg in FIG. 14, which acts to maintain a constant output level over a range of battery voltages.

FIG. 2 shows one possible control panel 54 where seven LEDs are aligned in two rows on the back portion 13 of the case 101. A MODE button 17 and a SET button 18 are used to input and control different variable parameters of the portable ionizer 100. To activate the device, the SET button is pressed for a predetermined period of time. In one embodiment, the predetermined period of time to activate the device is 2 seconds. Once active, the device starts in a low-power mode and low-frequency setting, which requires minimal operating power.

The ionizer 100 has three power output levels: a low level 21 representing 25% of the maximum voltage output, a medium level 20 representing 50% of the maximum voltage output, and a high level 19 representing 100% of the maximum voltage output. The power level is toggled between the three respective levels by pressing the MODE button 17 until the power LED 25 located above the power symbol is illuminated. The toggle is then performed by pressing the SET button 18 until one of the three LEDs 19, 20, 21 is illuminated indicating the power level selected. The ionizer 100 may be turned off by pressing the SET button 18 for a predetermined period of time. In one embodiment, the duration to deactivate the device is 2 seconds.

Changes in frequency of operation are performed in a similar way. The MODE button 17 is pressed until the frequency LED 23 is illuminated. By pressing the SET button 18, the frequency levels are toggled between the low level 21 at 4 Hz, the medium level 20 at 10 Hz, and the high level 19 at 25 Hz. Once the frequency is selected (i.e., the corresponding LED is lit), the control panel 54 returns to the power level as described above after 4 seconds of operation.

LED 22 blinks once a limit of operation is reached. In one embodiment, the needle 8 can operate for 1100 hours before LED 22 begins to blink. To reset this function, in one contemplated embodiment, the MODE and SET buttons 17, 18 are pressed concurrently for a predetermined period of time, such as 2 seconds, after a new needle tip 60 is placed into the needle protector 7. The needle holder 61 is preferably permanently fixed inside the unit.

Finally, LED 24 corresponds to a battery level, which lights in association with one of the three LED levels 19-21. A replacement of the battery 6 may require the destructive separation of the welded front and back portions 4, 13 with a tool (not shown) once the battery 6 is at the end of life or has failed, for example once it has reached 1000 charges, and a selective disposal of the battery 6 that is environmentally friendly.

A battery recharge outlet 26, as seen most clearly in FIG. 2, is located in opening 52 and allows for the connection of a DC charger connected in turn to a local power supply. In one embodiment, the charger is a 5 volt DC charger. In one contemplated embodiment, when the charger (not shown) is connected, the three LEDs 19, 20, 21 are lit sequentially, together with the Battery LED 24 to indicate the charge until the charger is removed from the outlet 26 or disconnected from the local supply.

In alternative contemplated embodiments, the pendant ionizer 100 can produce negative ions when the charger is connected to the outlet 26 to bypass the battery, or the ionizer 100 may be off. In one contemplated embodiment, the lithium-ion battery is charged until the maximum recharge of the battery 6, for example around 4.2 volts, is reached. If the voltage of the lithium-ion battery reaches a predetermined low voltage, for example of around 3.2 Volts, the circuit 5 may switch off the ionizer 100 until the battery can be recharged. In one contemplated embodiment, the battery 6 can produce negative ions for a period of 16 hours (at high setting) and up to 44 hours (at low setting). Once the battery can no longer be recharged, or for any other reason, the replacement of the battery requires the destructive separation of the opposite halves 4, 13 of the portable case 101 with a tool and the physical removal of the battery 6 from the circuit board 5.

In a power save mode, each portion of the power management system is used at minimal power. These improvements of the power management system includes turning the LEDs off after a selection is made using the MODE 17 or SET 18 buttons, except for the Battery LED 24 and the LED 19, 20, or 21 relating to the appropriate battery level, which blink at a very low duty cycle In an embodiment, shown in FIG. 15, the power management system further includes a low-noise self-resonant sine wave oscillator. In an embodiment a step-up converter, shown in FIG. 9, uses a pot core ferrite transformer operating at high frequency and driving into very high efficiency diodes and low capacitance capacitors.

A control module including a power management system, a transformer, and a multiplier is used to optimise power drain on the battery 6. Other features of the power management system include LED display shut-off, battery voltage cut-off, management of needle life use, and management of power supply drain time through frequency modulation and/or voltage control.

In an embodiment, the power management system includes a stand-by mode that is enabled when the needle discharge electrode 8 is not energised. In an embodiment, the power manager system further includes a balanced AC driver in the form of an AC inverter connected to a multiplexer.

While one type of control mechanism is shown, the use of other types of interface or control that allows for easy and quick change of power level, frequency, and/or other parameters as shown, or any other parameter including the use of sound devices, rollers, click-in buttons, or any other type of button, is contemplated.

In an embodiment, a method of advertisement of a service is contemplated where improved wellness is desired by a user using a portable air ionizer, the method including the steps of placing an advertisement of a service provider with users in need of an increased wellness on an exterior portion of a plurality of cases of air ionizers, distributing to users of the service a portable air ionizer, and displaying and using the portable air ionizer in association with a service of the service provider for association of the increased wellness with the service provider.

Figure 5:
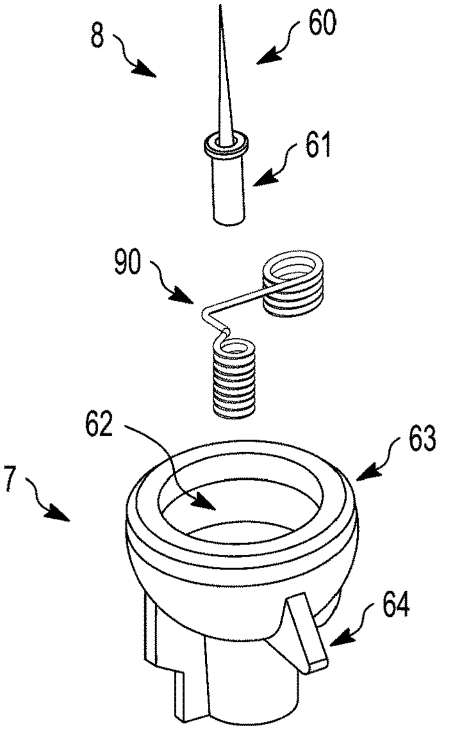
FIG. 5 is a close-up view of a needle and needle protector.

Returning to FIG. 1, and the greater detail shown in FIG. 5, a transparent window 1 is placed on a paper decal 2 snapped in place on the front case cover 4 using at least one snap clip made of a female portion 67 on the case cover 4 and a male portion 71 on the transparent window 1 passing as shown through an opening 70 made on the paper decal 2 to ultimately secure the paper decal to the pendant ionizer 100 creating a first information or advertising space 69 on the external surface of the portable case 4.

Once again, what is shown is a triangular paper decal 2 and attachment structure associated with the overall triangular shape of the pendant ionizer 100. One of ordinary skill in the art recognises that while one shape is contemplated, the information or advertising can be optimized by creative and aesthetic changes to suit the device. Furthermore, it is contemplated that the space 69 could be either shielded by the transparent window 1 or provided without such a window 1. For example, paper decal 2 can have an adhesive side, can be permanently fixed to the case cover 4, or can be made part of the case cover 4 either with or without relief, colour, or the like.

In use, the portable air ionisation device can be worn on a user, for example using neck strap 12, to provide biologically active negative ions of oxygen in a region around the user, particularly around a head region of the user. Once activated, the portable power source provides power to the circuit board which in turn energises the discharge electrode as desired. Ionized air is generated in the vicinity of the discharge electrode 8 and leaves the case 101 through primary opening 51.

Advantageously, the portable ionization device of the present invention has lower overall voltage multiplication required and reduced current consumption compared to previous less primitive designs that do no utilise a double-ended voltage multiplier. Furthermore, the self-resonant oscillator provides more reliable voltage generation and also reduce current consumption, particularly in relation to traditional bi-phase circuits. These improvements result in a significantly more energy efficient device which, due to its portable battery powered nature, results in less downtime and inconvenience to the user.

Due to the high voltages involved in energising the discharge electrode, there can be significant safety concerns with respect to the user. Significant effort has been made to ensure the portable ionization device is as safe as possible to the user. Other than the welded plastic case being considerably stronger than usual 'clipped' or interference fit cases, but it is also considerably safer than traditional designs.

It is understood that the preceding is merely a detailed description of some examples and embodiments of the present invention and that numerous changes to the disclosed embodiments can be made in accordance with the disclosure made herein without departing from the spirit or scope of the invention. The preceding description, therefore, is not meant to limit the scope of the invention but to provide sufficient disclosure to one of ordinary skill in the art to practice the invention without undue burden.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A portable air ionizer, comprising:

a discharge electrode electrically connected to a circuit board to produce ions when energised;

a portable power source electrically connected to the circuit board to energize the discharge electrode; and a portable case with a support means that substantially encloses the power source, the circuit board, and the discharge electrode, wherein the circuit board comprises a double ended voltage multiplier connected to an AC driver to energise the discharge electrode, wherein the double ended voltage multiplier comprises a plurality of alternating polarity diodes connected in parallel with a capacitor being connected between adjacent diodes.

2. The portable air ionizer of claim 1, wherein a first portion of the plurality of diodes are connected between a first input from the AC driver and a high voltage positive output and a second portion of the plurality of diodes are connected between a second input from the AC driver and a high voltage negative output.

3. The portable air ionizer of claim 1, wherein the AC driver comprises a power management system that includes a high voltage self-resonant sine-wave oscillator.

4. The portable air ionizer of claim 3, wherein the self-resonant sine-wave oscillator has predetermined limits.

5. The portable air ionizer of claim 3, wherein the self-resonant sine-wave oscillator is controlled by at least one of a voltage regulation circuit and a feedback system.

6. The portable air ionizer of claim 5, wherein the voltage regulation circuit is a dual-step voltage regulation circuit.

7. The portable air ionizer of claim 1, wherein the discharge electrode is a needle discharge electrode.

8. The portable air ionizer of claim 7, wherein the case is integral.

9. The portable air ionizer of claim 8, wherein the case comprises at least two portions which are welded together to form a single integral housing around the power source, the circuit board, and the needle discharge electrode.

10. The portable air ionizer of claim 1, wherein the discharge electrode is connected to the circuit board via an electrode spring member.

11. The portable air ionizer of claim 7, further comprising at least one ground electrode having at least a portion located externally of the portable case.

12. The portable air ionizer of claim 11, wherein the ground electrode is electrically connected to a negative pole of the portable power source via a ground spring.

13. The portable air ionizer of claim 12, wherein the ground spring comprises a torsion spring.

14. The portable air ionizer of claim 11, wherein at least two ground electrodes are provided, with at least one ground electrode being located on a first side of the portable case and at least one ground electrode being located on a second side of the portable case.

15. The portable air ionizer of claim 11, wherein the ground electrode is electrically connected to a cathode located adjacent a needle of the needle discharge electrode to produce an electric field between the needle discharge electrode and each ground electrode.

16. The portable air ionizer of claim 1, wherein the portable power source comprises a DC power source that comprises a rechargeable battery.

17. A portable air ionizer, comprising:

a needle discharge electrode electrically connected to a circuit board to produce ions when energised;

a portable power source electrically connected to the circuit board to energize the discharge electrode; and a portable case with a support means that substantially encloses the power source, the circuit board, and the needle discharge electrode, wherein the circuit board comprises a double ended voltage multiplier connected to an AC driver to energise the needle discharge electrode, wherein the needle discharge electrode is connected to the circuit board via an electrode spring member.

18. The portable air ionizer of claim 17, wherein the electrode spring member comprises a helical coil spring.

19. The portable air ionizer of claim 18, wherein the electrode spring member comprises two separate helical coil spring portions interconnected by a bridge portion.

20. The portable air ionizer of claim 18, wherein the electrode spring member is seated in a hollow of a concave, cup shaped needle holder.

* * * * *